US010451199B2

(12) United States Patent
Berger et al.

(10) Patent No.: US 10,451,199 B2
(45) Date of Patent: Oct. 22, 2019

(54) SEALING ARRANGEMENT AND VENTILATION, HEATING OR AIR CONDITIONING SYSTEM HAVING SUCH A SEALING ARRANGEMENT

(71) Applicant: MAHLE International GmbH, Stuttgart (DE)

(72) Inventors: Michael Berger, Kirchberg an der Murr (DE); Joachim Raimann, Korntal-Muenchingen (DE)

(73) Assignee: MAHLE International GmbH, Stuttgart (DE)

( * ) Notice: Subject to any disclaimer, the term of this patent is extended or adjusted under 35 U.S.C. 154(b) by 469 days.

(21) Appl. No.: 15/201,789

(22) Filed: Jul. 5, 2016

(65) Prior Publication Data

US 2017/0009912 A1 Jan. 12, 2017

(30) Foreign Application Priority Data

Jul. 6, 2015 (DE) .......................... 10 2015 212 593

(51) Int. Cl.
*F16L 5/10* (2006.01)
*B60R 13/08* (2006.01)
*F16J 15/02* (2006.01)
*B60H 1/00* (2006.01)

(52) U.S. Cl.
CPC ............ *F16L 5/10* (2013.01); *B60H 1/00521* (2013.01); *B60R 13/0846* (2013.01); *F16J 15/025* (2013.01); *B60H 1/00571* (2013.01)

(58) Field of Classification Search
CPC .... F16J 15/025; B60R 16/00; B60R 16/0222; B60R 13/0846; F16L 5/10; H02G 3/22; B60H 1/00571; B60H 1/00521
See application file for complete search history.

(56) References Cited

U.S. PATENT DOCUMENTS 4,041,241 A * 8/1977 Olmstead ............. H01B 17/308
174/153 G
4,656,689 A * 4/1987 Dennis .................... F16L 5/027
16/2.2
4,901,395 A * 2/1990 Semrau ............... B60R 13/0846
16/2.2

(Continued)

FOREIGN PATENT DOCUMENTS

CN 103080624 A 5/2013
DE 10 2006 039 648 B3 3/2008

(Continued)

*Primary Examiner* — Nicholas L Foster
(74) *Attorney, Agent, or Firm* — Muncy, Geissler, Olds & Lowe, P.C.

(57) ABSTRACT

A sealing arrangement for sealing at least one opening in a wall for the insertion of at least one tube through the opening, in particular in a dividing wall of a motor vehicle, with a sealing body having at least one first lead-through opening, wherein the sealing body has a circumferential groove having at least one sealing lip arranged in the area of the groove and surrounding the sealing body, and with a frame carrying the sealing body, and with a first frame edge formed peripherally on the frame and projecting therefrom. The first frame edge engages in a first recess of the sealing body in an axial direction and radially inwardly of the at least one sealing lip.

21 Claims, 8 Drawing Sheets

(56) References Cited

U.S. PATENT DOCUMENTS

| | | | | |
|---|---|---|---|---|
| 5,337,447 A | * | 8/1994 | Tanaka | H02G 3/083 |
| | | | | 16/2.2 |
| 5,774,934 A | * | 7/1998 | Fujita | B60R 16/0222 |
| | | | | 16/2.1 |
| 6,557,208 B2 | * | 5/2003 | Huet | B62D 25/24 |
| | | | | 16/2.1 |
| 6,675,439 B2 | * | 1/2004 | Hashimoto | B60R 16/0222 |
| | | | | 16/2.1 |
| 6,901,627 B2 | * | 6/2005 | Uchida | B60R 16/0222 |
| | | | | 16/2.1 |
| 7,026,549 B1 | | 4/2006 | Smutny et al. | |
| 8,042,225 B2 | | 10/2011 | Bringhenti | |
| 9,151,413 B2 | * | 10/2015 | Marold | F16L 5/10 |
| 2011/0127730 A1 | | 6/2011 | Seryi et al. | |

FOREIGN PATENT DOCUMENTS

| | | |
|---|---|---|
| DE | 10 2007 063 658 A1 | 4/2009 |
| DE | 10 2009 056 043 A1 | 6/2011 |
| DE | 10 2010 040 500 A1 | 3/2012 |
| EP | 2 103 487 B1 | 8/2010 |

\* cited by examiner

SEALING ARRANGEMENT AND VENTILATION, HEATING OR AIR CONDITIONING SYSTEM HAVING SUCH A SEALING ARRANGEMENT

This nonprovisional application claims priority under 35 U.S.C. § 119(a) to German Patent Application No. 10 2015 212 593.9, which was filed in Germany on Jul. 6, 2015, and which is herein incorporated by reference.

BACKGROUND OF THE INVENTION

Field of the Invention

The present invention relates to a sealing arrangement and a ventilation, heating or air conditioning system with such a sealing arrangement.

Description of the Background Art

EP 2 103 487 B1, which corresponds to U.S. Pat. No. 8,042,225, discloses a grommet for sealing a conduit, such as a cable or a tube through an opening having a sealing body and a gasket or a sealing flange. The gasket or sealing flange are radially arranged outside of the sealing body. The grommet is used, for example, for sealing a cable harness, which is inserted through a dividing wall from the engine compartment into the passenger compartment of a motor vehicle.

U.S. Pat. No. 7,026,549 B1 discloses a one-piece grommet formed of an elastomer which extends through an aperture in a panel and serves to pass a device, such as a cable harness, through the panel. The grommet has for this purpose a tubular elongated area functioning as a lead-through. Said area extends from an inlet side of the panel through the opening to an outlet side of the panel. The tubular elongated area is thereby surrounded by a shield-like area. The shield-like area has a foldable wall with a circumferential, uniform wall thickness and a corrugated shape, and forms a sound chamber outside the tubular elongated area. Adjacent to the shield-like area, a connecting region is arranged, having a mounting flange.

These grommets disclosed in the prior art have sealing arrangements which could be improved even further. This concerns in particular the challenge of securely sealing inserted tubes through an opening in a dividing wall arranged between the engine compartment and the passenger compartment, so that even at extreme temperatures, for example, during an engine wash, water cannot penetrate into the vehicle cabin over the area of the opening. In addition, improved insulation of the engine noise is desirable since thus far, this penetrates insufficiently insulated through the area of the opening into the vehicle cab, thus reducing the comfort of the vehicle occupants.

SUMMARY OF THE INVENTION

It is therefore an object of the invention to provide a further improved sealing arrangement. Also, it is an object of the invention to provide a ventilation, heating or air conditioning, with which such a sealing arrangement is used.

An exemplary embodiment of the invention relates to a sealing arrangement for sealing at least one opening in a wall to insert at least one tube through the opening, in particular in a dividing wall of a motor vehicle, comprising a sealing body having at least one first lead-through opening, wherein the sealing body has a circumferential groove with at least one sealing lip arranged in the region of the groove and surrounding the sealing body, and with a frame which carries the sealing body, and with a projecting, first frame edge circumferentially formed on the frame, wherein the first frame edge engages in an axial direction radially inwardly of the at least one sealing lip in a first recess of the sealing body. By this arrangement, a lead-through of tubes reliably sealed against water entry is made possible by a dividing wall arranged between the engine compartment and the passenger compartment of a motor vehicle, which can also be fixed firmly and in a simple assembly step in the area of the opening.

In an embodiment of the sealing arrangement, the groove sets circumferentially radially inwardly around an edge region of the opening, such that the at least one sealing lip sealingly and circumferentially radially inwardly abuts against the edge region of the opening.

In an embodiment of the sealing arrangement, the wall has a first wall side axially facing in a first direction, and a second wall side facing in the second direction that is situated axially opposite the first direction, wherein the frame can be connected in the region of the opening with the first wall side and/or the sealing body in such a way, that the first frame edge substantially engages axially in the first recess of the sealing body, wherein said first frame edge carries the sealing body in a mounting position arranged in the region of the opening, in particular against the wall and/or the edge region of the opening. This increases the stable seat of the sealing arrangement at the dividing wall and simplifies the mounting of the sealing arrangement.

In an embodiment of the sealing arrangement, the first frame edge has at least one web, wherein the at least one web substantially axially extends the first rim edge in the second direction, and radially inside the at least one sealing lip, engages in a second recess of the sealing body. This facilitates the assembly of the individual components during the assembly process and provides for their secure cohesion during operation of the sealing arrangement.

In an embodiment of the sealing arrangement, an insulating member can be arranged in the first direction, axially rearward of the frame, wherein said insulating member is formed in particular of a sound-absorbing material, for example a foam, and/or has at least one second lead-through opening. In this way, the sound insulation against engine noise is increased at the opening, which improves the feeling of comfort of the vehicle occupants.

An embodiment of the sealing arrangement provides that the first frame edge can substantially protrude axially pointing in the second direction and/or the frame has a peripheral projecting second frame edge, wherein the second frame edge substantially protrudes axially pointing in the first direction and/or protrudes axially pointing in the second direction and surrounds a portion of the insulating member radially outwardly.

In an embodiment of the sealing arrangement, the sealing body can have sealing lips with the same and/or different lengths and/or sealing lips, which are formed tapered to the radial direction, facing away from the sealing body. In the area of the opening, sealing lips thus formed engage in the periphery of the opening at different angles in a folded manner, thereby sealing particularly effectively and increasing to a considerable extent the tightness of the sealing arrangement.

In an embodiment of the sealing arrangement, a gasket can be arranged in the first direction, axially rearward of the frame and/or in the first direction, axially rearward of the insulating member, wherein the gasket is made of an elastomer, such as EPDM and/or rubber and/or silicone, and/or has at least a third lead-through opening and/or a peripheral gasket edge and/or a gasket edge projecting obliquely in the radial direction, said gasket edge forming a first plane, which intersects a second plane, formed of a flow cross-section of the at least third lead-through opening, at an angle of 180° or less than 180°. The gasket improves the seal and also contributes to soundproofing and to the motor-space side protection of the sealing arrangement.

In an embodiment of the sealing arrangement, the sealing body has four first lead-through openings and/or the insulating member has three second lead-through openings and/or the gasket has four third lead-through openings and/or at least one of the first lead-through openings and/or at least one of the second lead-through openings and/or at least one of the third lead-through openings is/are penetrated by a tube. Advantageously, the sealing arrangement can thus be used for performing refrigerant outflow and inflow and coolant inflow and outflow of an automotive air conditioning system through the opening.

In an embodiment of the sealing arrangement, the at least one first lead-through opening and/or the at least one second lead-through opening and/or the at least one third lead-through opening can be arranged in such a way that they form a substantially tunnel-like structure which extends through the wall in the area of the opening. This facilitates the insertion of pipes during installation of the sealing arrangement, for example, in a dividing wall of a motor vehicle.

In an embodiment of the sealing arrangement, the frame has a first frame side axially facing in the first direction, and a second frame side axially facing in the second direction, wherein in the area of the second frame side, in an area situated between the first frame edge and the second frame edge, a peripheral and substantially channel-like frame structure is formed such, that the channel-like frame structure has a first channel side wall and a second channel sidewall situated opposite the first channel side wall, wherein the first channel side wall is formed substantially by the first frame edge, and the second channel side wall is substantially formed by the second frame edge, wherein at least one, two, three, four, five, six, seven or, advantageously, eight, nine, ten or more than ten slot openings substantially vertical to the axial direction and evenly and/or unevenly spaced apart are arranged in the region of the channel-like frame structure.

In an embodiment of the sealing arrangement, the sealing body has a first sealing body side axially facing in the first direction, and a second sealing body side axially facing in the second direction, and a circumferential sealing body edge region, wherein the sealing body edge region has at least one, two, three, advantageously four, five, six, seven, eight, nine, ten or more than ten plug buttons axially facing in the first direction and uniformly and/or non-uniformly spaced apart, wherein said at least one plug button is designed to correspond with the at least one plug opening and in which at least one plug opening can be inserted, in such a way that the at least one plug opening and the at least one plug button connect the frame and the sealing body with one another and/or support the frame and the sealing body against each other. In this way, a secure and stable connection between the frame and the sealing body as well as stable positioning of the sealing arrangement is achieved in the region of the opening in an advantageous manner.

In an embodiment of the sealing arrangement, in the area of the at least one first lead-through opening and/or adjacent thereto, at least one fold surrounding the at least one first lead-through opening, and/or an everted collar surrounding the at least one first lead-through opening, projecting in the first direction and/or an everted collar surrounding the at least one first lead-through opening, projecting in the second direction, can be formed.

In an embodiment of the sealing arrangement, the at least one fold and/or the at least one everted collar projecting in the first direction and/or the at least one everted collar projecting in the second direction, has at least one sealing groove profile inwardly pointing toward the at least one first lead-through opening, which can be arranged on a tubular casing of at least one tube in a sealingly fitting manner.

In an embodiment of the sealing arrangement, the sealing body can include a sealing body internal section, wherein the sealing body edge region surrounds the sealing body internal section and a substantially slot-like first recess is arranged in the region of the first sealing body side in an area between the sealing body internal section and the sealing body peripheral region, wherein in particular, the first frame edge axially engages in the first recess and/or can be axially inserted in the first recess. In this way, the stability of the sealing arrangement is increased and the insertion of pipes through the sealing body during assembly is simplified.

In an embodiment of the sealing arrangement, in the area of the first recess, at least one, in particular tapered shaft-like second recess, is arranged, wherein the at least one second recess corresponds to the at least one ridge and the at least one ridge axially engages in the at least one second recess and/or can be axially inserted in the at least one second recess. In this way, mountability and stability of the sealing arrangement can be further improved.

In an embodiment of the sealing arrangement, at least one, or for example, two, three, four or more than four tab-like devices can be arranged in the area of the second sealing body side and in the region of the at least one second recess, wherein the at least one tab-like device substantially axially extends the sealing body edge region and/or the at least one second recess in the second direction, and substantially faces away from the second sealing body side.

In an embodiment of the sealing arrangement, the at least one tab-like device is arranged tapered radially inwardly in the area of the second sealing body side, in such a way, that a plane formed by the at least one tab-like device intersects a plane formed by the second sealing body side at an angle of less than 90°.

In an embodiment of the sealing arrangement, the at least one tab-like device includes a first tab side and a second tab side situated opposite the first tab side, wherein the first tab side and/or the second tab side has/have a surface profile. In this way, positioning of the sealing arrangement during assembly is simplified and the respective step is shortened.

In an embodiment of the sealing arrangement, at least one fixing hole is arranged in the region of the second frame edge, wherein a fixing element, in particular a screw, can be inserted through the at least one fixing hole, wherein said frame can be connected by means of the fixing element in particular adjacent to the opening with the first wall side. Thus, the frame can be fastened stably and secure in the region of the opening on the wall.

In an embodiment of the sealing arrangement, the sealing body can be made of an elastomer, such as EPDM and/or rubber and/or silicone. This additionally improves tightness.

In an embodiment of the sealing arrangement, the sealing body edge region, especially in the area of the second sealing body side, is curved radially inwardly and formed extending axially in the second direction and to a plane formed by the second sealing body side at an angle of less than 90°. This also facilitates the mounting of the sealing arrangement in the region of the opening.

In an embodiment of the ventilation, heating or air conditioning system with at least one heat exchanger with fluid-supplying and fluid-discharging tubes provides that for sealing the tubes in an opening of a wall, a sealing arrangement according to the present invention can be used.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
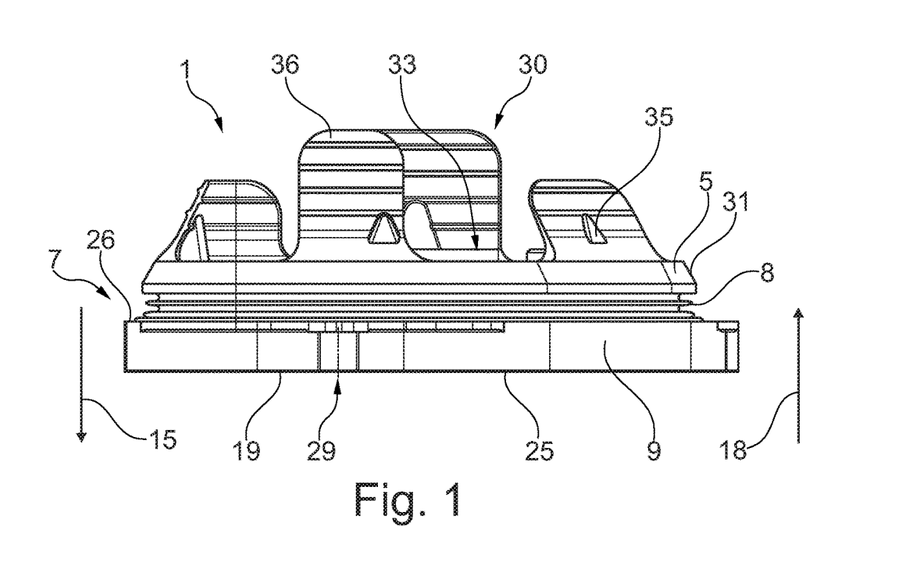
FIG. 1 is a side view of a sealing body associated with a frame as part of the inventive sealing arrangement.

FIG. 1 shows a side perspective view of a sealing arrangement 1 with a sealing body 5 and a frame 9 connected to a sealing body 5. Due to the viewing direction, FIG. 1 in particular shows the second frame edge of the frame 9 chosen for FIG. 1. The frame 9 has a first frame side 25 facing in a first axial direction 15 and a second frame side 26 facing in a second axial direction 18, opposite the first direction 15. In the region of the second frame side 26, the sealing body 5 is positioned in the second direction 18 rearward of the frame 9.

The sealing body 5 has a sealing body internal section 33 and a sealing body edge region 31 surrounding the sealing body internal section 33.

The sealing body 5 has, in the region of its sealing body edge region 31, a groove 7 surrounding the sealing body edge region 31. In the region of the groove 7, at least one, preferably, two, three or more than three sealing lip/sealing lips 8 is/are formed which encircle the sealing body edge region 31 in the region of the groove 7 and face radially outwardly.

The sealing body 5 further comprises a first sealing body side 29 facing in the first direction 15 and a second sealing body side 30 facing in the second direction 18. The sealing body edge region 31, particularly in the region of the second sealing body side 30, axially extends in the second direction 18 and is designed curved radially inwardly to a plane formed by the second sealing body side 30, at an angle of less than 90°. In alternate embodiments, the sealing body edge region 31 is not curved.

In the embodiment shown in FIG. 1, the sealing body edge region 31 has at least one tab-like device 36 in the region of the second sealing body side 30. The number of tab-like devices 36 may vary in different embodiments. The at least one tab-like device 36 is arranged radially inwardly and chamfered in the region of the second sealing body side 30 such, that a plane formed by the at least one tab-like device 36 intersects the plane formed by the second sealing body side 30 at an angle of less than 90°. The at least one tab-like device 36 in this case has a first side and a second side, the first side and/or the second side having a surface profile which provides an improved grip for the at least one tab-like device 36. In alternative embodiments, the at least one tab-like device 36 may be omitted or not be formed chamfered and/or may not have a profile and/or may have a profile only on its first side and/or only on its second side.

In the area of the sealing body edge region 31, at least one shaft-like second recess 35 is arranged, which substantially axially protrudes in the second direction 18 from the first sealing body side 29 to the second sealing body side 30. In the area of the first sealing body side 29, the at least one second recess 35 thereby forms a shaft opening. In the area of the second sealing body side 30, the at least one second recess 35 forms a ridge, which is arranged particularly in the region of the at least one tab-like device 36. The number of second recesses 35 can vary in different embodiments. In addition, the second recess 35 may also be omitted.

Figure 2:
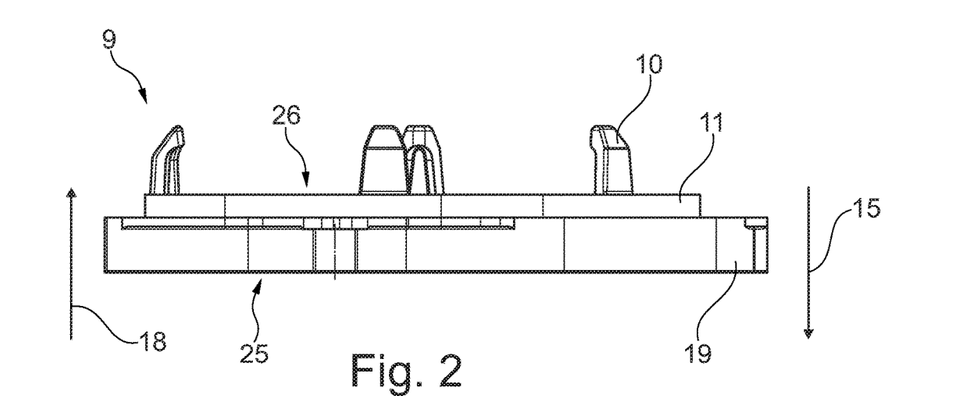
FIG. 2 is a side view of the frame according to FIG. 1.

In FIG. 2, the frame 9 is shown in a side view. The frame 9 has a first frame side 25 facing in the first direction 15 and a second frame side 26 facing in the second direction 18. In addition, the frame 9 has a first frame edge 11 and a second frame edge 19 which radially outwardly surrounds the first frame edge 11. The first frame edge 11 projects in the second direction 18 and has at least one ridge 10 facing in the second direction 18. The at least one ridge 10 extends the first frame edge 11 substantially axially in the second direction 18.

The number of ridges 10 and the number of frame edges 11, 19 may vary in different embodiments. The at least one ridge 10 is formed such, that it fits into the at least one second recess 35 formed in the sealing body 5 not shown in FIG. 2 and substantially fills the at least one second recess 35. The at least one web 10 thereby extends in particular into the at least one tab-like device 36 formed in the area of the at least one second recess 35, also not shown in FIG. 2. By way of example, the at least one ridge 10 may be designed hook-shaped bent at its end facing away from the frame 9.

Figure 3:
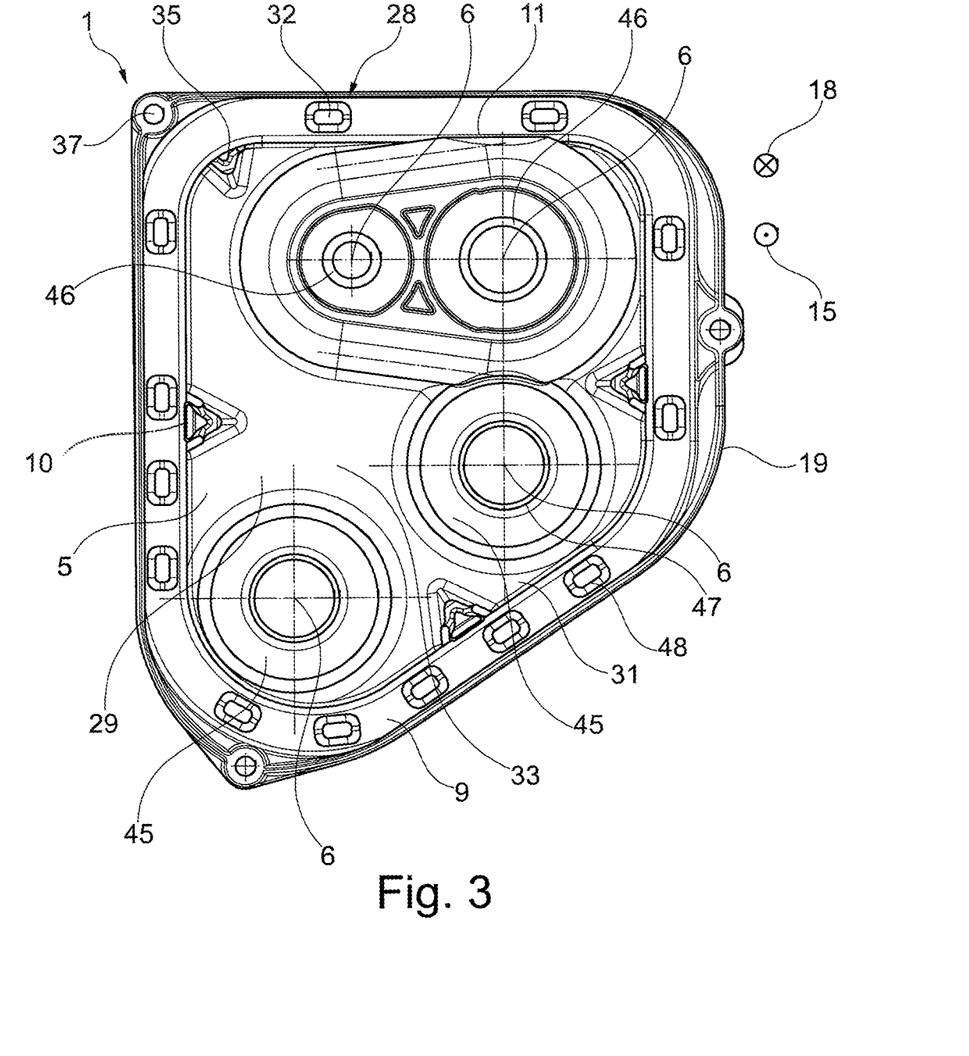
FIG. 3 is a frame-side plan view of the frame connected to the sealing body according to FIG. 1.

FIG. 3 shows a frame side plan view of the sealing arrangement 1 with the sealing body 5 and a frame 9 connected with the sealing body 5. The sealing body 5 has a centrally arranged sealing body internal section 33 and a sealing body edge region 31 adjacently arranged to the sealing body internal section 33. Four second recesses 35 are arranged in the sealing body edge region 31, which will be discussed in more detail.

In an area positioned between the first frame edge 11 and the second frame edge 19, the frame 9 has a number of partially uniformly and partially unevenly spaced plug openings 28. Through the individual plug openings 28 and formed in the sealing body edge region 31 on the first sealing body side 29, a plug button 32 in each case projects through the frame 9. The plug buttons 32 are in particular formed in one piece with the sealing body 5 and have a detent 48 at its end facing away from the sealing body 5. The detent 48 is thereby inserted into the plug opening 28 and holds the plug button 32 in the plug opening 28. The number, shape and spacing of the plug buttons 32, as well as of the corresponding plug openings 28, will vary in different embodiments.

In the area of the second frame edge 19, a number of evenly and/or unevenly spaced fixing holes 37 are arranged. The individual fixing holes 37 are each suitable for inserting a holding element 25, in particular a screw.

The sealing body 5 has four first lead-through openings 6. Tubes 3 also not shown in FIG. 3 are inserted through the first four lead-through openings 6 in a not-shown assembled state of the sealing arrangement, said tubes in particular serving as an inlet and outlet of a refrigerant and/or the inlet and outlet of a coolant. Adjacent and/or in the area of the first lead-through openings 6, surface structures are formed in the region of the first sealing body side 29. These surface structures are designed such, that they substantially run along the circumference of the first lead-through openings 6. To this end, for example, folds 45 and/or everted collars 46 projecting in the first direction 15 and/or everted collars 47 projecting in the second direction may be formed as surface structures in the area of the first lead-through openings 6. These surface structures are particularly suitable for increasing the tightness between said tubes 3 not shown in FIG. 3 and the sealing body 5 in the area of the first lead-through openings 6 as well as for facilitating the insertion of the tubes 3 through the sealing body 5 during assembly.

Figure 4:
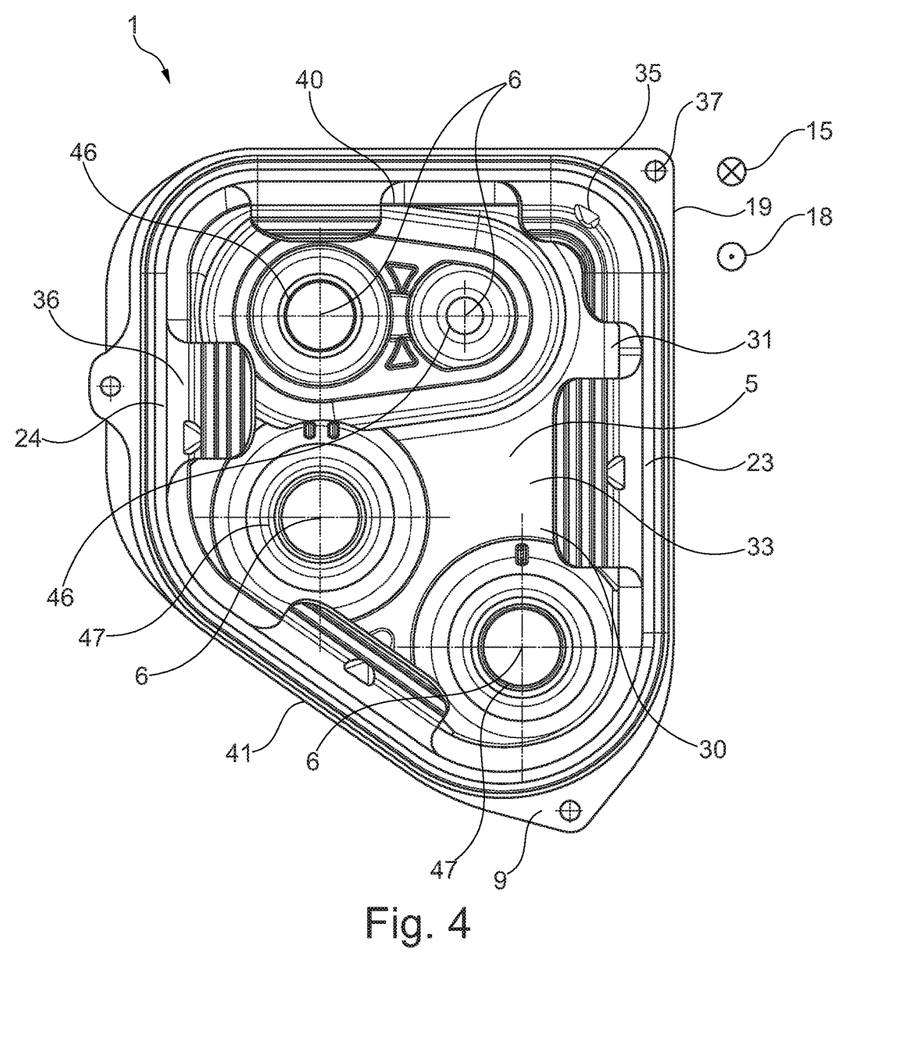
FIG. 4 is a sealing body side plan view of the sealing body connected to the frame according to FIG. 1.

FIG. 4 illustrates a plan view of the sealing arrangement 1 on the second sealing body side 30 with the sealing body 5 and with a frame 9 connected to the sealing body 5. The sealing body edge region 31 has a first sealing body longitudinal side 23 and a second sealing body longitudinal side 24 situated opposite the first sealing body longitudinal side 23. In this embodiment, the first sealing body longitudinal side 23 and the second sealing body longitudinal side 24 are arranged substantially parallel. The first sealing body longitudinal side 23 has an approximate length which corresponds to two thirds of the length of the second sealing body longitudinal side 24. Furthermore, the sealing body edge region 31 has a first sealing body lateral side 40 which is substantially vertically disposed between the first sealing body longitudinal side 23 and the second sealing body longitudinal side 24, and a second sealing body lateral side 41 which is substantially diagonally arranged to the first sealing body lateral side 40. In alternative embodiments, these aspect ratios as well as the arrangement described may vary.

The frame 9 has three fixing holes 37 in the region of its second frame edge 19 which serve to fasten the frame 9 on the wall 4 not shown in FIG. 4. The attachment is in particular done by means of screws which are inserted through the fixing holes 37 and are not shown in FIG. 4.

In this case, the frame 9 has a peripheral shape which is substantially congruent with the peripheral shape of the sealing body edge region 31. The peripheral shape of the frame 9 can have different shapes in different embodiments. The peripheral shape of the sealing body edge region 31 may also vary or deviate from the peripheral shape of the frame 9.

In the region of the sealing body internal section 33 and adjacent to the first sealing body lateral side 40, two first lead-through openings 6 are formed, each having an everted collar 46 projecting in the first direction 15. One of these first two lead-through openings 6 is also disposed adjacent to the second sealing body longitudinal side 24. The other of the two first lead-through openings 6 disposed adjacent to the first sealing body lateral side 40 is also disposed adjacent to the first sealing body longitudinal side 23. The first lead-through opening 6, which is disposed adjacent to the second sealing body longitudinal side 24 and adjacent to the first sealing body lateral side 40, serves as the first lead-through opening 6 for the insertion of a tubular refrigerant flow. This first lead-through opening 6 has a diameter which is approximately twice as large as the diameter of the first lead-through opening 6, which is disposed adjacent to the first sealing body lateral side 40 and adjacent to the first sealing body longitudinal side 23 and which serves for the insertion of a tubular refrigerant feed.

In the region of the sealing body internal section 33 and adjacent to the second sealing body lateral side 41, in this embodiment, two further first lead-through openings 6 are formed, each with an everted collar 47 projecting in the second direction 18. In addition, one of these two further first lead-through openings 6 is disposed adjacent to the second sealing body longitudinal side 24. The other of the two further first lead-through openings 6 disposed adjacent to the second sealing body lateral side 41 is also disposed adjacent to the first sealing body longitudinal side 23. These two further first lead-through openings 6 each serve for the insertion of a tubular inlet for a coolant and/or the insertion of a tubular outlet for a coolant, and the diameters of these two further first lead-through openings 6 are mutually approximately the same size. In alternative embodiments, the diameter and the configuration mentioned may vary.

The number and arrangement of the fixing holes 37 shown in FIG. 4 of the second recesses 35 and the tab-like devices 36 may also vary in different embodiments. In alternative embodiments, moreover, less or more than four first lead-through openings 6 may be formed in the region of the sealing body internal section 33.

In the assembled state of the sealing arrangement, tubes 3 are inserted through the four first lead-through openings 6, which in particular serve for the inlet and outlet of a refrigerant and/or the inlet and outlet of a coolant. Surface structures are formed adjacent to and/or in the region of the first lead-through openings 6 in the region of the first sealing body side 29 and/or in the region of the second sealing body side 30. These surface structures are formed such, that they substantially run along the periphery of the first lead-through openings 6.

In this regard, surface structures, for example, folds 45 in the area of the first lead-through openings 6 and/or everted collars 46 projecting in the first direction 15 and/or everted collars 47 projecting in the second direction, can be formed. These surface structures are particularly suitable for increasing the tightness between said tubes 3 and the sealing body 5 in the area of the first lead-through openings 6 as well as for facilitating the insertion of the tubes 3 through the sealing body 5 during assembly.

Figure 5:
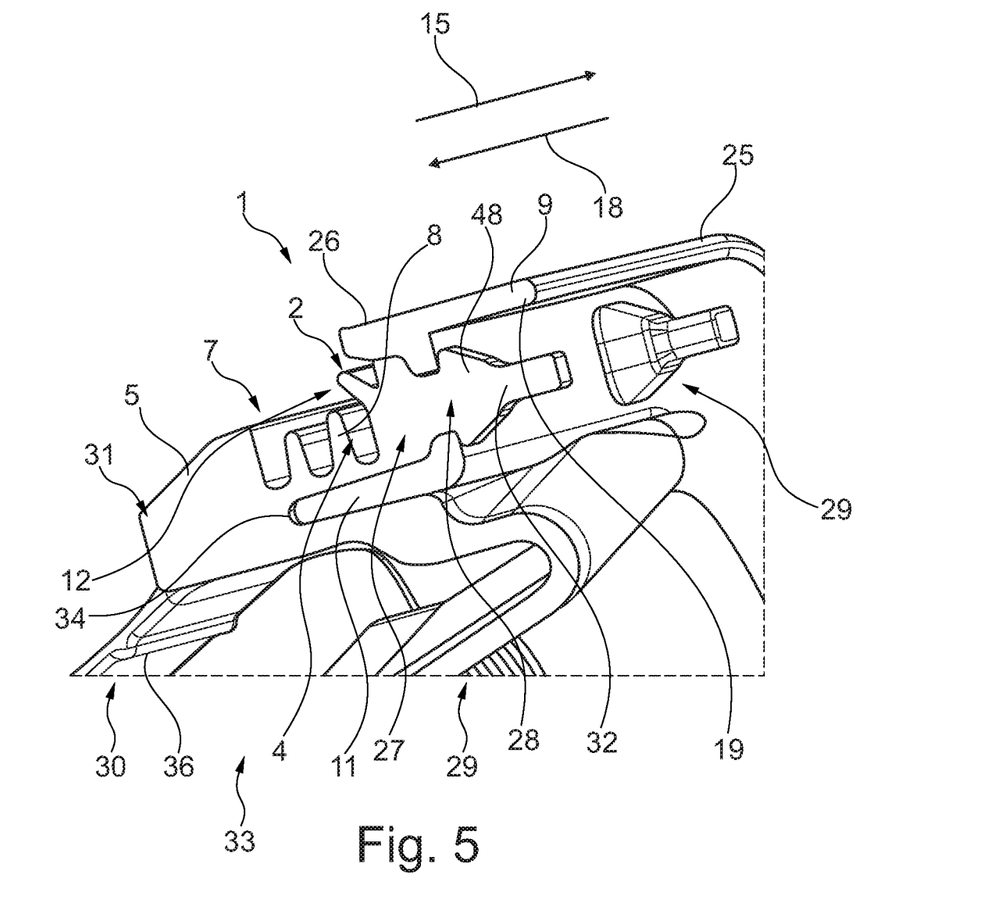
FIG. 5 is a section through a perspective view of a portion of the sealing arrangement according to FIG. 1.

FIG. 5 is a view of a section illustrated by a perspective view of a portion of the sealing arrangement 1. The first frame edge 11 is formed axially projecting and facing in the second direction 18 of the second frame side 26. The second frame edge 19 is formed axially projecting and facing in the second direction 18 of the second frame side 26 and formed axially projecting and facing in the first direction 15 of the first frame side 25. In a region between the first frame edge 11 and the second frame edge 19, a channel-like frame structure 27 is formed. In the area of the channel-like frame structure 27, the plug openings 28 are arranged. The plug buttons 32 integrally formed with the sealing body 5 in the area of the first sealing body 29 and in the area of the sealing body edge region 31 protrude through the plug openings 28 in particular with the detents 48 formed in the region of their ends, axially facing away from the sealing body 5 in the first direction 15 and thereby connecting the sealing body 5 with the frame 9.

The first frame edge 11 engages in a first recess 34 formed on the first sealing body side 29 substantially as a surrounding gap which is disposed running radially in the region between the sealing body internal section 33 and the sealing body edge region 31. The frame 9 thereby carries the sealing body 5.

The groove 7 is formed in the second direction 18, axially rearward of the plug buttons 32 in the area of the sealing body edge region 31. In the region of the groove 7, three sealing lips 8 are arranged in the embodiment shown in FIG. 5. In alternative embodiments, fewer or more than three sealing lips may be arranged in the region of the groove 7. The sealing lips 8 have different lengths. Two of the three sealing lips 8 which are adjacent to each other substantially protrude in the radial direction from the region of the groove 7. A third sealing lip 8, which is located adjacent to the first sealing body side 29, extends obliquely 10 out of the groove 7. The sealing lip 8 obliquely projecting from the groove 7 is beveled approximately at an angle of 45° to the radial direction toward the center of the groove 7. The groove 7 and the sealing lips 8 sealingly bear at an edge region 12 of the opening 2 arranged in the wall 4.

FIG. 5 shows that the tab-like devices 36 are arranged in the region of the second sealing body side 30 and in the region of the sealing body edge region 31. When assembling the sealing device 1 in the region of the opening 2, the tab-like devices 36 serve as a mounting aid.

Figure 6:
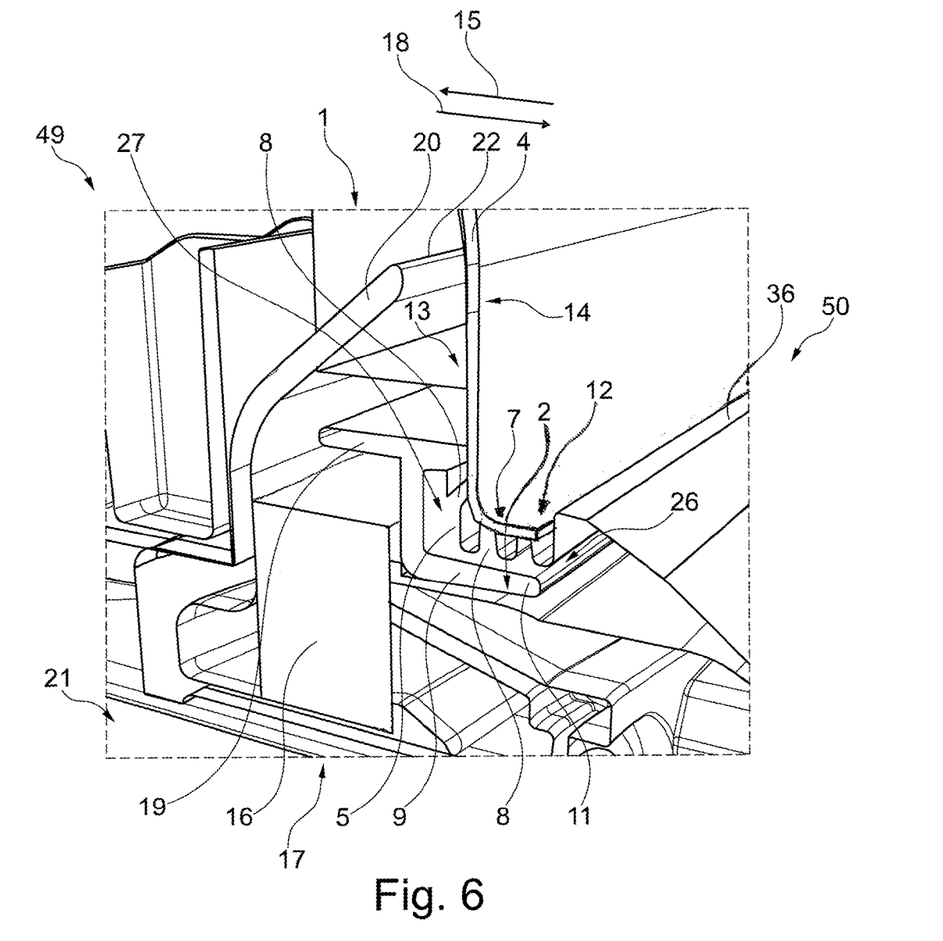
FIG. 6 is a section through a further perspective view of the sealing arrangement according to FIG. 1.

FIG. 6 illustrates that the frame 9 is fixed to a wall 4, in particular to a dividing wall 4 of a motor vehicle in the region of an opening 2. In this case, during assembly of the sealing arrangement 1 in the motor vehicle, the frame 9 and the sealing body 5 connected with the frame 9 are inserted in the opening 2 from an interior space 49 disposed in front of the dividing wall 4. The interior space 49 is hereby separated by the dividing wall 4 from an engine compartment 50 arranged rearward of the dividing wall 4. During assembly with the second side frame 26 in the region of the opening 2, the frame 9 is attached to a first wall side 13 facing the interior space 49. The sealing body 5 is pulled, for example, by means of the tab-like devices 36, through the opening 2 into the area of the second wall side 14 facing the engine compartment 50. The webs 10 formed on the first frame edge 11, which are not shown in FIG. 6 for purposes clarity, protrude into the shaft-like second recesses 35, likewise not shown for clarity in FIG. 6, thereby carrying the sealing body 5.

Figure 7:
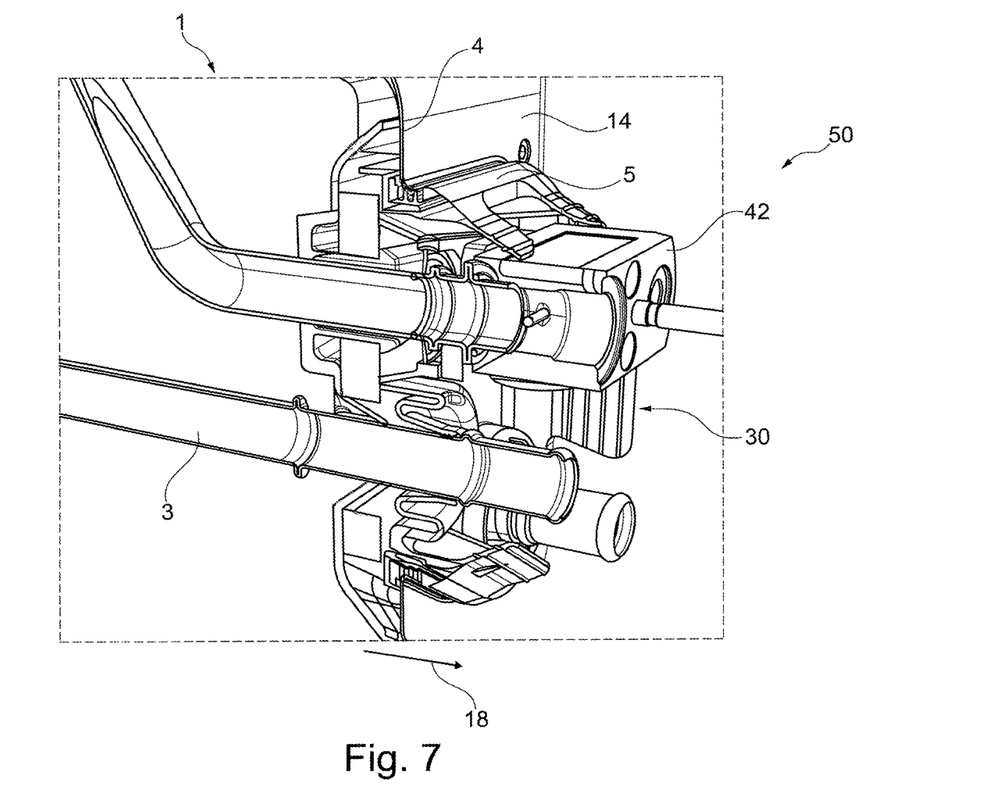
FIG. 7 is a section through a further perspective view of the sealing arrangement according to FIG. 1.

FIGS. 6 and 7 show an embodiment of the sealing arrangement 1 installed on a dividing wall 4 of a motor vehicle. An insulating member 16 is thereby arranged in the first direction 15, axially rearward of the frame 9. The insulating member 16 is, by way of example, formed of a particularly sound-absorbent foam and has at least one second lead-through opening 17. In the first direction 15, axially rearward of the insulating member 16, a gasket 20 is arranged. The gasket 20 is formed in particular of an elastic and/or rubber-like material and has at least one third lead-through opening 21. In alternative embodiments, the insulating member 16 and/or the collar 20 may be omitted. The gasket 20 has a gasket edge 22 which obliquely protrudes to the radial direction, such that the edge of the gasket 22 forms a plane which intersects a plane formed of a flow cross-section of the at least one third lead-through opening 21 at an angle of 180° or less than 180°.

The dividing wall 4 has a passage in the area of the opening 2, facing in the second direction 18. In the edge region 12 of the opening 2, the passage forms a bearing surface arranged substantially parallel to the groove 7, which the sealing lips 8 bear against. The sealing lips 8 are arranged in the region of the channel-like frame structure 27, and in a bent manner sealingly abut the bearing surface formed by the passage at different angles to a plane formed by the groove 7. The second frame edge 19 rests directly on the first wall side 13.

FIG. 7 shows a partial view of an embodiment of the sealing arrangement 1 installed on a dividing wall 4 of a motor vehicle. The tubes 3 extend through the opening and are sealed by means of the sealing arrangement 1, as previously described. In the second direction 18, axially rearward of the sealing body 5, by way of example, a refrigerant flange 42 is arranged in the area of the second sealing body side 30 and in the second direction 18, rearward of the second wall side in the region of the engine compartment 50.

Figure 8:
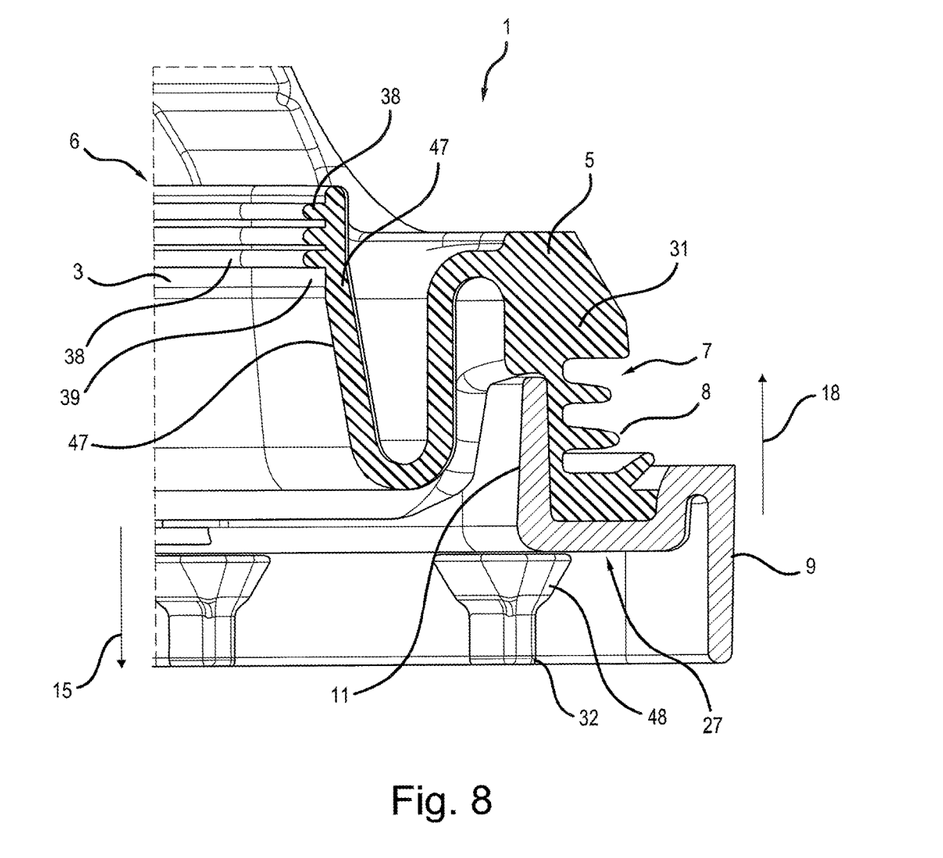
FIG. 8 is a section through a further perspective view of a portion of the sealing arrangement according to FIG. 1.

FIG. 8 shows a section through a further perspective view of a portion of the sealing arrangement 1. For example, a tube 3 may be inserted through a first lead-through opening 6. In the area of the at least one first lead-through opening 6 and adjacent to the tube 3, the sealing body 5 has, for example, an everted collar 47 projecting in the second direction 18. The at least one everted collar 47 projecting in the second direction has a sealing profile 38 on its side facing the tube 3, which sealingly bears against a tubular casing 39 of a tube 3. The number of the first lead-through openings 6 which have an everted collar 47 projecting in the second direction 18 with a sealing groove profile 38, as well as the design of the at least one sealing groove profile 38, may vary in different embodiments.

The groove 7 is formed in the second direction 18, axially rearward of the detents 48 and the plug buttons 32, in the region of the sealing body edge section 31. In the area of the groove 7, in the embodiment illustrated in FIG. 8, three sealing lips 8 facing away from the first frame edge 11 are arranged. In alternative embodiments, also fewer or more than three sealing lips 8 may be arranged in the region of the groove 7. The sealing lips 8 have different lengths. Two of the three sealing lips 8, which are adjacent to each other, extend substantially in the radial direction out of the region of the groove 7. A third sealing lip 8, which is arranged adjacent to the channel-like frame structure 27 formed by the frame 9, projects obliquely out of the groove 7. The sealing lip 8 extending obliquely out of the groove 7 is beveled at about an angle of 45° to the radial direction toward the center of the groove 7.

Figure 9:
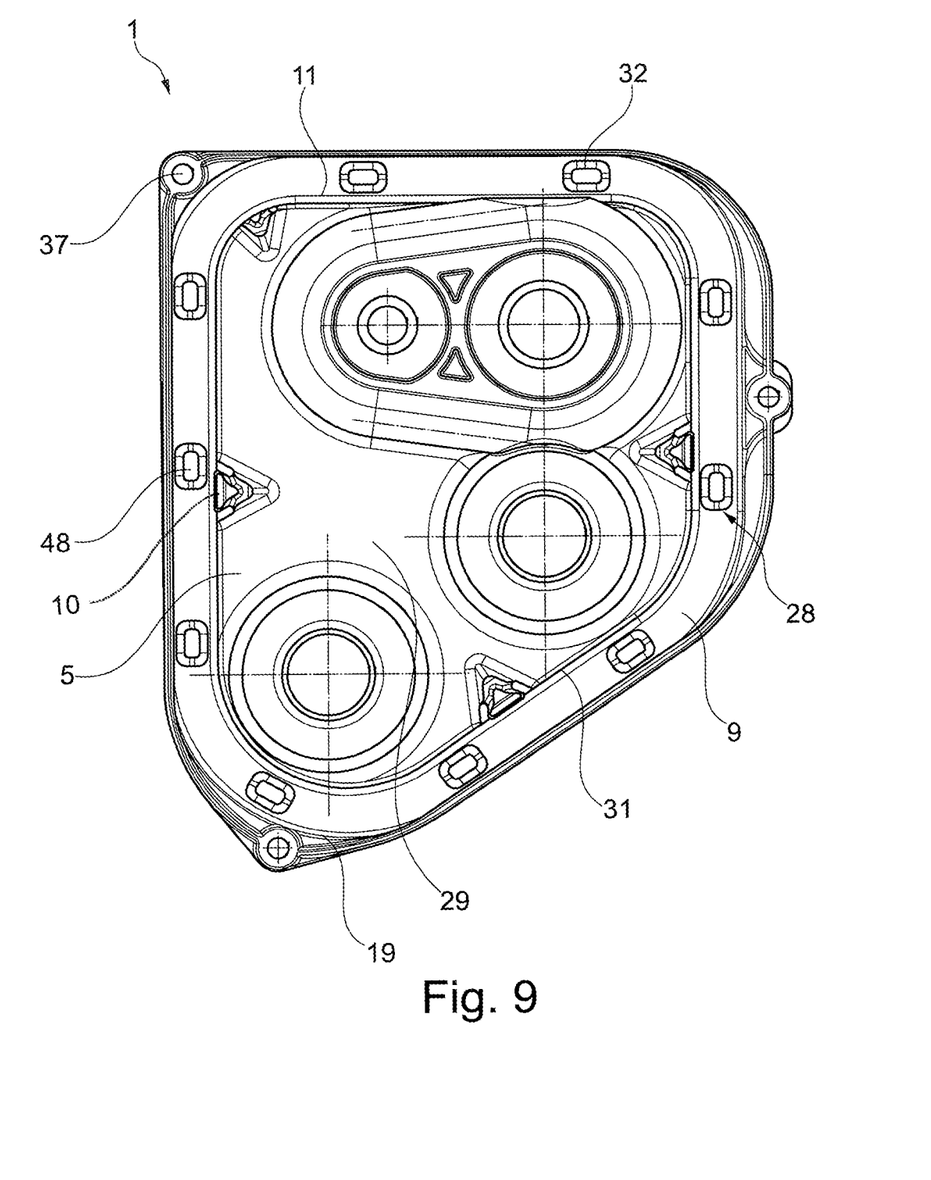
FIG. 9 is a frame-side plan view of an embodiment of the frame connected to the sealing body.

FIG. 9 shows a frame-side plan view of an embodiment of the sealing arrangement 1, which frame 9 has a series of equally spaced plug openings 28 in an area arranged between the first frame edge 11 and the second frame edge 19. Through the individual plug openings 28, in each case a plug button 32 formed in the sealing body edge region 31 on the first sealing body side 29 extends through the frame 9. The plug buttons 32 are in particular formed in one piece with the sealing body 5 and have a detent 48 at their end, facing away from the sealing body 5. The detent 48 is thereby inserted into the plug opening 28 and holds the plug button 32 in the plug opening 28. The number, shape and spacing of the plug buttons 32, as well as of the corresponding plug openings 28, will vary in different embodiments. In the area of the second frame edge 19, a number of fixing holes 37 is arranged. The individual fixing holes 37 are suitable for the insertion of a holding element, in particular a screw. The number, shape and spacing of the fixing holes 37 vary in different embodiments. The first lead-through openings 6 shown in FIG. 9 and the second recesses 35 and the sealing body internal section 33 are designed in this embodiment according to the embodiment shown in FIG. 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sealing arrangement for sealing at least one opening in a wall of a motor vehicle through which at least one tube is inserted, the arrangement comprising:
    a sealing body with at least one first lead-through opening;
    a circumferential groove formed on the sealing body, the circumferential groove having at least one sealing lip arranged in an area of the groove and surrounding the sealing body;
    a frame carrying the sealing body; and
    a projecting first frame edge peripherally formed on the frame,
    wherein the first frame edge engages, in an axial direction, in a first recess of the sealing body, the first recess located radially inward from the at least one sealing lip,
    wherein the first frame edge has at least one ridge, the at least one ridge axially extending from the first frame edge in a second direction opposite a first direction and radially engaging in a second recess of the sealing body,
    wherein the first frame edge axially projects in the second direction and the frame has a peripheral projecting second frame edge, and wherein the second frame edge axially projects in the first direction, and
    wherein the frame has a first frame side axially facing in the first direction, and a second frame side axially facing in the second direction, wherein, in a region of the second frame side, a circumferential and channel-like frame structure is arranged in a region disposed between the first frame edge and the second frame edge such that the channel-like frame structure has a first channel side wall and a second channel side wall situated opposite the first channel side wall, wherein the first channel side wall is formed by the first frame edge and the second channel side wall is formed by the second frame edge, and wherein, in the region of the channel-like frame structure, at least one plug opening is arranged substantially vertical to the axial direction.

2. The sealing arrangement according to claim 1, wherein the groove is configured to be positioned radially inward from an edge region of the at least one opening of the wall such that the at least one sealing lip is configured to sealingly bear against the edge region of the at least one opening of the wall.

3. The sealing arrangement according to claim 2, wherein the wall has a first wall side axially facing in the first direction and a second wall side axially facing in the second direction situated opposite the first direction, wherein the frame is capable of being connected with the first wall side or the sealing body in a region of the at least one opening of the wall such that the first frame edge axially engages the first recess of the sealing body, and wherein the first frame edge is capable of carrying the sealing body in the region of the at least one opening of the wall, against the wall, and in the edge region of the at least one opening of the wall.

4. The sealing arrangement according to claim 3, wherein an insulating member is arranged in the first direction axially rearward of the frame, and wherein the insulating member is made of a sound-absorbing material or a foam, and has at least one lead-through opening.

5. The sealing arrangement according to claim 4, wherein the second frame edge radially outwardly surrounds a portion of the insulating member.

6. The sealing arrangement according to claim 1, wherein the sealing body comprises a plurality of the at least one sealing lip that each have a same or different lengths, wherein the plurality of the at least one sealing lip project away from the sealing body in a radial direction or project away from the sealing body slanted in the radial direction.

7. The sealing arrangement according to claim 4, wherein a gasket is disposed in the first direction axially rearward of the frame or in the first direction axially rearward of the insulating member, wherein the gasket is made of an elastomer, EPDM, rubber, or silicone, wherein the gasket has at least one lead-through opening and a gasket edge that is circumferential and obliquely projecting in the radial direction.

8. The sealing arrangement according to claim 7, wherein the sealing body has four of the at least one first lead-through opening, the insulating member has three of the at least one lead-through opening of the insulation member and the gasket has four of the at least one lead-through opening of the gasket and the at least one tube is insertable through the at least one first lead-through opening of the sealing body, the at least one lead-through opening of the insulating member and the at least one lead-through opening of the gasket.

9. The sealing arrangement according to claim 8, wherein the at least one first lead-through opening of the sealing body, the at least one lead-through opening of the insulating member and the at least one lead-through opening of the gasket are arranged such that they form a substantially tunnel-like structure which is capable of protruding through the wall in a region of the at least one opening of the wall.

10. The sealing arrangement according to claim 1, wherein the sealing body has a first sealing body side axially facing in the first direction, and a second sealing body side axially facing in the second direction and a peripheral sealing body edge region, wherein the peripheral sealing body edge region has at least one plug button axially facing in the first direction, and wherein the at least one plug button corresponds with the at least one plug opening and is insertable through the at least one plug opening such that the at least one plug opening and the at least one plug button connect the frame and the sealing body with each other and support the frame and the sealing body against each other.

11. The sealing arrangement according to claim 1, wherein, in an area adjacent to the at least one first lead-through opening, at least one fold surrounding the at least one first lead-through opening or an everted collar projecting in the first direction and surrounding the at least one first lead-through opening or an everted collar projecting in the second direction and surrounding the at least one first lead-through opening is formed.

12. The sealing arrangement according to claim 11, wherein the at least one fold or the everted collar projecting in the first direction or the everted collar projecting in the second direction has at least one sealing groove profile inwardly oriented toward the at least one first lead-through opening, which is capable of being arranged sealingly fitted on a tubular casing of the at least one tube.

13. The sealing arrangement according to claim 10, wherein the sealing body has a sealing body internal section, wherein the peripheral sealing body edge region surrounds the sealing body internal section and, in an area of the first sealing body side, the first recess is arranged in an area between the sealing body internal section and the peripheral sealing body edge region, and wherein the first frame edge axially engages in the first recess or is insertable axially into the first recess.

14. The sealing arrangement according to claim 1, wherein, in an area of the first recess, the second recess is arranged, wherein the second recess corresponds with the at least one ridge, and wherein the at least one ridge is axially insertable in the second recess.

15. The sealing arrangement according to claim 10, wherein, in a region of the second sealing body side and in a region of the second recess of the sealing body, at least one tab-shaped device is arranged, and wherein the at least one tab-shaped device substantially extends the peripheral sealing body edge region or substantially axially extends the second recess in the second direction and substantially faces away from the second sealing body side.

16. The sealing arrangement according to claim 15, wherein the at least one tab-shaped device is arranged tapered radially inwardly in Rthellan area of the second sealing body side.

17. The sealing arrangement according to claim 15, wherein the at least one tab-shaped device comprises a first tab side and a second tab side situated opposite the first tab side, wherein the first tab side or said second tab side have a surface profile.

18. The sealing arrangement according to claim 5, wherein at least one fixing hole is arranged in a region of the second frame edge, wherein a fixing element or a screw is insertable through the at least one fixing hole, and wherein the frame is connectable by the fixing element or the screw with the first wall side adjacent to the at least opening of the wall.

19. The sealing arrangement according to claim 1, wherein the sealing body is made of an elastomer, EPDM, rubber, or silicone.

20. The sealing arrangement according to claim 10, wherein the peripheral sealing body edge region, in a region of the second sealing body side, is formed curved radially inwardly at an angle of less than 90°.

21. A sealing arrangement for sealing at least one opening in a wall of a motor vehicle through which at least one tube is inserted, the arrangement comprising:

a sealing body with at least one first lead-through opening;

a circumferential groove formed on the sealing body, the circumferential groove having at least one sealing lip arranged in an area of the groove and surrounding the sealing body;

a frame carrying the sealing body; and a projecting first frame edge peripherally formed on the frame, wherein the first frame edge engages, in an axial direction, in a first recess of the sealing body, the first recess located radially inward from the at least one sealing lip, wherein, below the groove in the axial direction, the sealing body includes at least one axially extending plug button, the at least one axially extending plug button having a detent thereon, wherein the frame further includes a second frame edge that projects peripherally from the frame, wherein at least one plug opening is provided between the first frame edge and the second frame edge, the detent of the at least one axially extending plug button extending through the at least one plug opening, and wherein the detent of the at least one axially extending plug button is larger than the at least one plug opening, such that the detent retains the at least one axially extending plug button in the at least one plug opening.

* * * * *